(12) United States Patent
Yang

(10) Patent No.: US 11,156,351 B2
(45) Date of Patent: Oct. 26, 2021

(54) BACKLIGHT MODULE AND METHOD OF MANUFACTURING SAME

(71) Applicant: Wuhan China Star Optoelectronics Technology Co., Ltd., Wuhan (CN)

(72) Inventor: Yong Yang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 524 days.

(21) Appl. No.: 16/308,350

(22) PCT Filed: Oct. 9, 2018

(86) PCT No.: PCT/CN2018/109426
§ 371 (c)(1),
(2) Date: Dec. 7, 2018

(87) PCT Pub. No.: WO2020/042280
PCT Pub. Date: Mar. 5, 2020

(65) Prior Publication Data
US 2021/0222867 A1    Jul. 22, 2021

(30) Foreign Application Priority Data
Aug. 28, 2018    (CN) .................. 201810990295.X

(51) Int. Cl.
*F21V 23/00*    (2015.01)
*F21V 33/00*    (2006.01)
(Continued)

(52) U.S. Cl.
CPC ............ *F21V 33/0052* (2013.01); *F21K 9/90* (2013.01); *F21S 4/22* (2016.01); *F21Y 2115/10* (2016.08)

(58) Field of Classification Search
CPC ... F21S 4/22; G02F 1/133603; F21V 33/0052
See application file for complete search history.

(56) References Cited

U.S. PATENT DOCUMENTS

2007/0109788 A1    5/2007    Pan
2007/0297163 A1    12/2007    Kim et al.
(Continued)

FOREIGN PATENT DOCUMENTS

CN    101097345 A    1/2008
CN    102506347 A    6/2012
(Continued)

*Primary Examiner* — Karabi Guharay
(74) *Attorney, Agent, or Firm* — Kirton McConkie; Evan R. Witt

(57) ABSTRACT

A backlight module and a method of manufacturing same are provided. The backlight module includes a flexible circuit substrate. The flexible circuit substrate includes a flexible substrate, a first pad, a second pad, a mineral oil layer, and a light emitting diode (LED) chip. The first pad and the second pad are disposed on the flexible substrate. The mineral oil layer is disposed on the flexible substrate and is patterned to form a window opening region. Two ends of the LED chip are electrically connected to a positive electrode of the first pad and a negative electrode of the second pad respectively through the window opening region. The window opening region exposes at least the positive electrode and the negative electrode.

13 Claims, 4 Drawing Sheets

(51) Int. Cl.
*F21S 4/22* (2016.01)
*F21K 9/90* (2016.01)
*F21Y 115/10* (2016.01)

(56) References Cited

U.S. PATENT DOCUMENTS

2011/0163338 A1* 7/2011 Won .................. H01L 33/46
                                                  257/98
2013/0051070 A1   2/2013 Wu
2019/0327825 A1* 10/2019 Zha ................ G02F 1/133603

FOREIGN PATENT DOCUMENTS

| | | |
|---|---|---|
| CN | 103703579 A | 4/2014 |
| CN | 203675421 U | 6/2014 |
| CN | 104075194 A | 10/2014 |
| CN | 104449118 A * | 3/2015 |
| CN | 104851395 A | 8/2015 |
| CN | 206833117 U | 1/2018 |
| CN | 107910322 A | 4/2018 |
| JP | 2007067116 A | 3/2007 |
| TW | 200719028 A | 5/2007 |

* cited by examiner

S10 — Providing a flexible substrate having a front copper trace and a back copper trace formed on surfaces of the flexible substrate, wherein the flexible substrate includes a first pad and a second pad spaced from each other, the first pad includes a positive electrode, the second pad includes a negative electrode, and an intermediate region between the positive electrode and the negative electrode is positioned S20 — Forming a mineral oil layer on the flexible substrate and performing a thinning treatment to the mineral oil layer in the intermediate region, such that the mineral oil layer in the intermediate region forms a height difference with the mineral oil layer in a remaining region S30 — Etching the mineral oil layer, forming a window opening region exposing at least the positive electrode and the negative electrode outside the intermediate region, and then curing the mineral oil layer S40 — Electrically connecting the LED chip to the positive electrode and the negative electrode through the window opening region

FIG. 4

BACKLIGHT MODULE AND METHOD OF MANUFACTURING SAME

FIELD OF INVENTION

The present disclosure relates to the field of liquid crystal display technologies, and more particularly to a backlight module and a method of manufacturing same.

BACKGROUND OF INVENTION

Sub-millimeter light emitting diodes (surface light sources) are now a hotspot in the market and have many advantages such as light weight, power savings, being flexible and foldable, high brightness, making wide-screen display devices with narrow bezels, and making display devices with high dynamic contrast (HDR). Therefore, the sub-millimeter light emitting diodes have become a focus of market attention. However, due to reflectivity limitations of a plate having mineral oil and area limitations of a window opening region of the plate having the mineral oil, current surface light sources have low light-emitting efficiency and low brightness. Due to heat resistance issues of other film layers, applications of the surface light sources have been limited, and there is no better way to solve these issues.

Therefore, current technologies have drawbacks and need to be improved.

SUMMARY OF INVENTION

The present disclosure provides a backlight module and a method of manufacturing same, which can increase an area ratio of a mineral oil layer on a flexible substrate, ensure a size and tolerance of a window opening region of the mineral oil layer, and this improves an illuminating performance of a surface light source.

In order to solve the above technical problems, a technical solution of the present disclosure is as follows.

According to an aspect of an embodiment of the present disclosure, a backlight module is provided. The backlight module includes a surface light source and a flexible circuit substrate. The flexible circuit substrate includes a flexible substrate, a first pad, a second pad, a mineral oil layer, and a light emitting diode (LED) chip. The first pad is disposed on the flexible substrate. The second pad is disposed on the flexible substrate and spaced apart from the first pad. The mineral oil layer is disposed on the flexible substrate, the first pad, and the second pad. The mineral oil layer is patterned to form a window opening region. The LED chip is disposed on the mineral oil layer. Two ends of the LED chip are electrically connected to the first pad and the second pad respectively through the window opening region. The LED chip forms a first overlapping region with the first pad, a second overlapping region with the second pad, and a non-overlapping region between the first overlapping region and the second overlapping region. The window opening region overlaps at least the first overlapping region and the second overlapping region.

In an embodiment of the present disclosure, the flexible circuit substrate further includes a back copper trace disposed on one side surface of the flexible substrate and a front copper trace disposed on another side surface of the flexible substrate, and the front copper trace is connected to the LED chip.

In an embodiment of the present disclosure, the mineral oil layer is disposed on the front copper trace, and a portion of the LED chip corresponding to the non-overlapping region is insulated from the front copper trace using the mineral oil layer.

In an embodiment of the present disclosure, a thickness of the mineral oil layer corresponding to the non-overlapping region is less than a thickness of the mineral oil layer corresponding to a remaining region.

In an embodiment of the present disclosure, the first pad includes a positive electrode, the second pad includes a negative electrode, the LED chip is connected to the positive electrode through the first overlapping region, and the LED chip is connected to the second overlapping region through the negative electrode.

In an embodiment of the present disclosure, the window opening region extends from a boundary of the non-overlapping region to two sides or a periphery of the window opening region to form the window opening region exposing at least the first overlapping region and the second overlapping region, and areas of the window opening region corresponding to the first pad and the second pad at two sides of the non-overlapping region are same.

An embodiment of the present disclosure further provides a method of manufacturing a backlight module. The backlight module includes a surface light source and a flexible circuit substrate. The method includes:

a step S10 of providing a flexible substrate having a front copper trace and a back copper trace formed on surfaces of the flexible substrate, wherein the flexible substrate includes a first pad and a second pad spaced from each other, the first pad includes a positive electrode, the second pad includes a negative electrode, and an intermediate region between the positive electrode and the negative electrode is positioned;

a step S20 of forming a mineral oil layer on the flexible substrate and performing a thinning treatment to the mineral oil layer in the intermediate region, such that the mineral oil layer in the intermediate region forms a height difference with the mineral oil layer in a remaining region.

a step S30 of etching the mineral oil layer, forming a window opening region exposing at least the positive electrode and the negative electrode outside the intermediate region, and then curing the mineral oil layer; and a step S40 of electrically connecting the LED chip to the positive electrode and the negative electrode through the window opening region.

In an embodiment of the present disclosure, in the step S20, performing the thinning treatment to the mineral oil layer in the intermediate region includes embossing the mineral oil layer in the intermediate region using a corresponding imprinting die or etching the mineral oil layer using an etching process.

In an embodiment of the present disclosure, in the step S30, etching the mineral oil layer includes grasping a center of the intermediate region, and etching from a boundary of the intermediate region to two sides or a periphery of the intermediate region with reference to the center of the intermediate region to form the window opening region exposing at least the positive electrode and the negative electrode, wherein areas of the window opening region corresponding to the first pad and the second pad at the two sides of the intermediate region are same.

An embodiment of the present disclosure further provides a backlight module. The backlight module includes a surface light source and a flexible circuit substrate. The flexible circuit substrate includes a flexible substrate, a first pad, a second pad, a mineral oil layer, and a light emitting diode (LED) chip. The first pad is disposed on the flexible substrate. The second pad is disposed on the flexible substrate and spaced apart from the first pad. The mineral oil layer is disposed on the flexible substrate, the first pad, and the second pad. The mineral oil layer is patterned to form a window opening region. The LED chip is disposed on the mineral oil layer. Two ends of the LED chip are electrically connected to the first pad and the second pad respectively through the window opening region. The LED chip forms a first overlapping region with the first pad, a second overlapping region with the second pad, and a non-overlapping region between the first overlapping region and the second overlapping region. Areas of the first overlapping region and the second overlapping region are same. The window opening region overlaps at least the first overlapping region and the second overlapping region.

In an embodiment of the present disclosure, the flexible circuit substrate further includes a back copper trace disposed on one side surface of the flexible substrate and a front copper trace disposed on another side surface of the flexible substrate, and the front copper trace is connected to the LED chip.

In an embodiment of the present disclosure, the mineral oil layer is disposed on the front copper trace, and a portion of the LED chip corresponding to the non-overlapping region is insulated from the front copper trace using the mineral oil layer.

In an embodiment of the present disclosure, a thickness of the mineral oil layer corresponding to the non-overlapping region is less than a thickness of the mineral oil layer corresponding to a remaining region.

In an embodiment of the present disclosure, the first pad includes a positive electrode, the second pad includes a negative electrode, the LED chip is connected to the positive electrode through the first overlapping region, and the LED chip is connected to the second overlapping region through the negative electrode.

In an embodiment of the present disclosure, the window opening region extends from a boundary of the non-overlapping region to two sides or a periphery of the window opening region to form the window opening region exposing at least the first overlapping region and the second overlapping region, and areas of the window opening region corresponding to the first pad and the second pad at two sides of the non-overlapping region are same.

The present disclosure has beneficial effects that compared with a current backlight module, in the backlight module and the manufacturing method of same of the embodiment of the present disclosure, the intermediate region between the positive electrode of the first pad and the negative electrode of the second pad of the flexible circuit substrate including the mineral oil layer is positioned, and a structure of the window opening region has a positioning function. Compared with a current structure of a window opening region, the embodiment can reduce an area of the window opening region of the mineral oil layer and increase an area ration of the mineral oil layer on the substrate, such that a pad size on two sides of the opening window region of the mineral oil layer is ensured to be same. On one hand, a reflectivity of an entire surface of the substrate is increased to improve an overall illuminating performance of a surface light source, and on another hand, an area of the opening window region and tolerance on two sides of the mineral oil layer in the intermediate region is controlled, such that an arrangement of the LED chip is not tilted in subsequent die bonding and reflow soldering processes, and an overall uniformity of the surface light source is improved.

DESCRIPTION OF DRAWINGS

The accompanying figures to be used in description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

FIG. 4 is flowchart of a method of manufacturing a flexible circuit substrate according to an embodiment of the present disclosure.

DETAILED DESCRIPTION OF PREFERRED EMBODIMENTS

Figure 1:
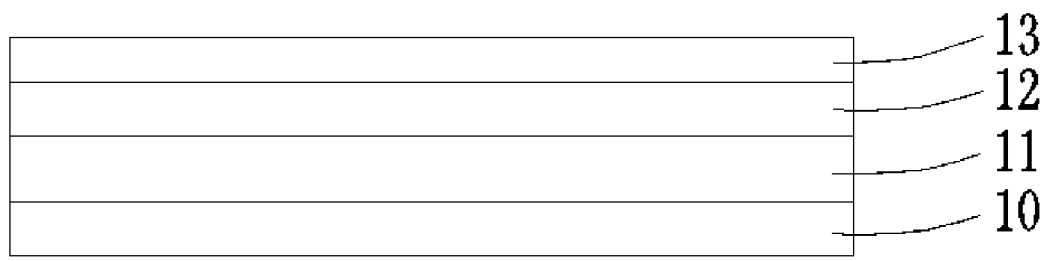
FIG. 1 is a cross sectional view of a flexible circuit substrate of a backlight module according to an embodiment of the present disclosure.

The embodiments described herein with reference to the accompanying drawings are explanatory, illustrative, and used to generally understand the present disclosure. Furthermore, directional terms described by the present disclosure, such as top, bottom, front, back, left, right, inner, outer, side, etc., are only directions by referring to the accompanying drawings, and thus the used terms are used only for the purpose of describing embodiments of the present disclosure and are not intended to be limiting of the present disclosure. In the drawings, modules with similar structures are labeled with the same reference number.

The present disclosure provides a backlight module to address technical problems and solves drawbacks of current backlight modules that there are limitations of a reflectivity of a substrate having mineral oil and an area of a window opening region of the substrate having the mineral oil, such that current surface light sources have low light-emitting efficiency and low brightness.

The present disclosure will be further described below in conjunction with accompanying drawings and specific embodiments.

Refer to FIG. 1, a cross sectional view of a flexible circuit substrate of a backlight module according to an embodiment of the present disclosure is provided. In an embodiment, the backlight module includes a surface light source and the flexible circuit substrate. The flexible circuit substrate includes a flexible substrate 11, a pad (not shown in the figure), a back copper trace 10, a front copper trace 12, and a mineral oil layer 13. The flexible substrate 11 may be a polyimide (PI) material. The pad is configured to connect a light emitting diode (LED) chip and is disposed on the flexible substrate 11. The back copper trace 10 is disposed on one side surface of the flexible substrate 11. The front copper trace 12 is disposed on another side surface of the flexible substrate 11. The front copper trace 12 is connected to the LED chip to define a circuit connection manner of the LED chip of the backlight module and ensure a normal operation of the LED chip. The mineral oil layer 13 is disposed on the flexible substrate 11 and formed on the front copper trace 12. The mineral oil layer 13 is a solder resist layer on the flexible substrate 11 to avoid short circuit of the LED chip during soldering to the pad. Since a reflectivity of metal copper is less than that of the mineral oil, the mineral oil layer 13 is also used to increase a reflectivity of a surface of the flexible circuit substrate and improve illuminating performance of the surface light source. The LED chip is a flip chip, and the LED chip has a size of 100 μm to 500 μm, which is also called a sub-millimeter light emitting diode.

Figure 2A:
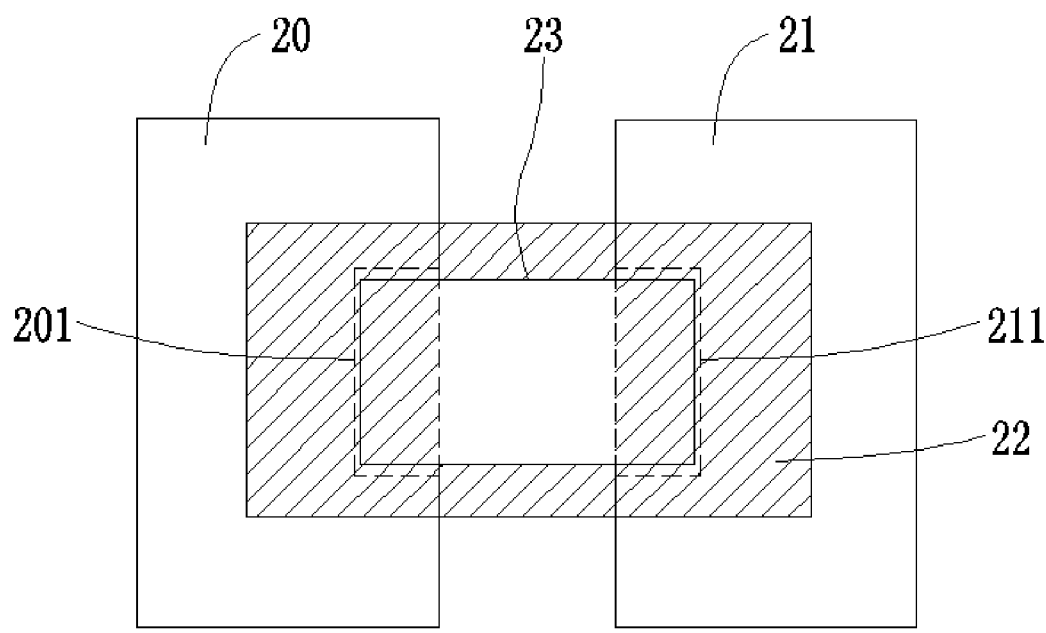
FIG. 2A is a schematic structural diagram of a window structure of a mineral oil layer of a flexible circuit substrate according to an embodiment of the present disclosure.
Figure 2B:
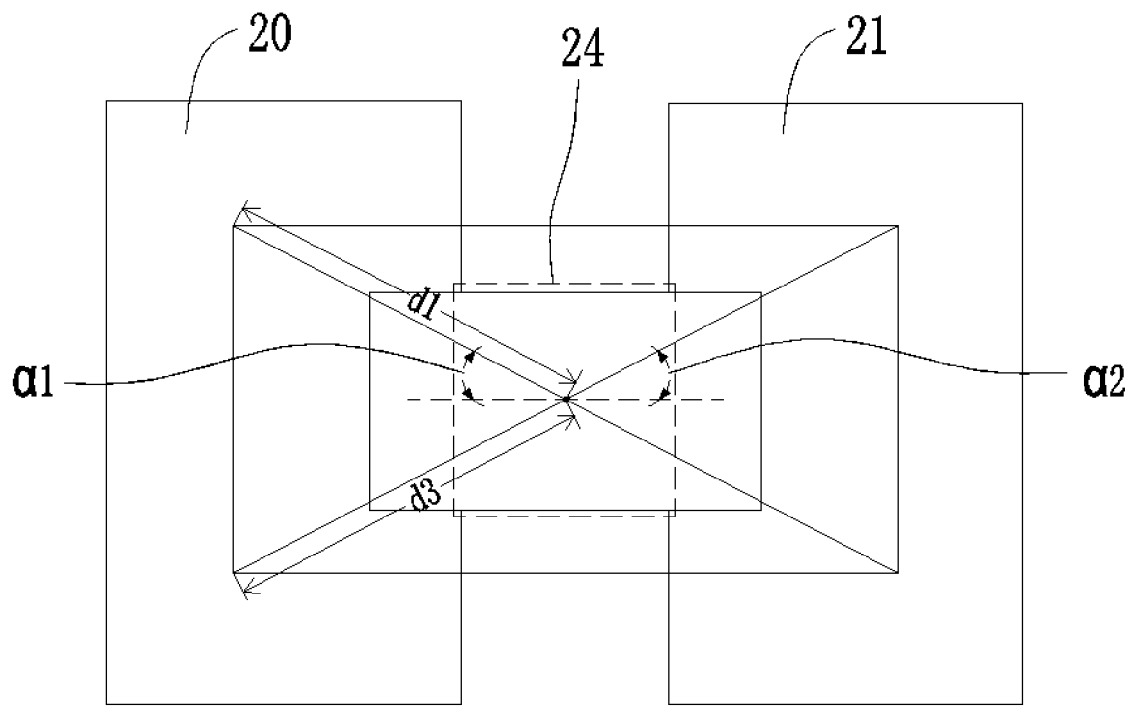
FIG. 2B is a schematic structural diagram of a window structure of a mineral oil layer of a flexible circuit substrate according to an embodiment of the present disclosure.
Figure 2C:
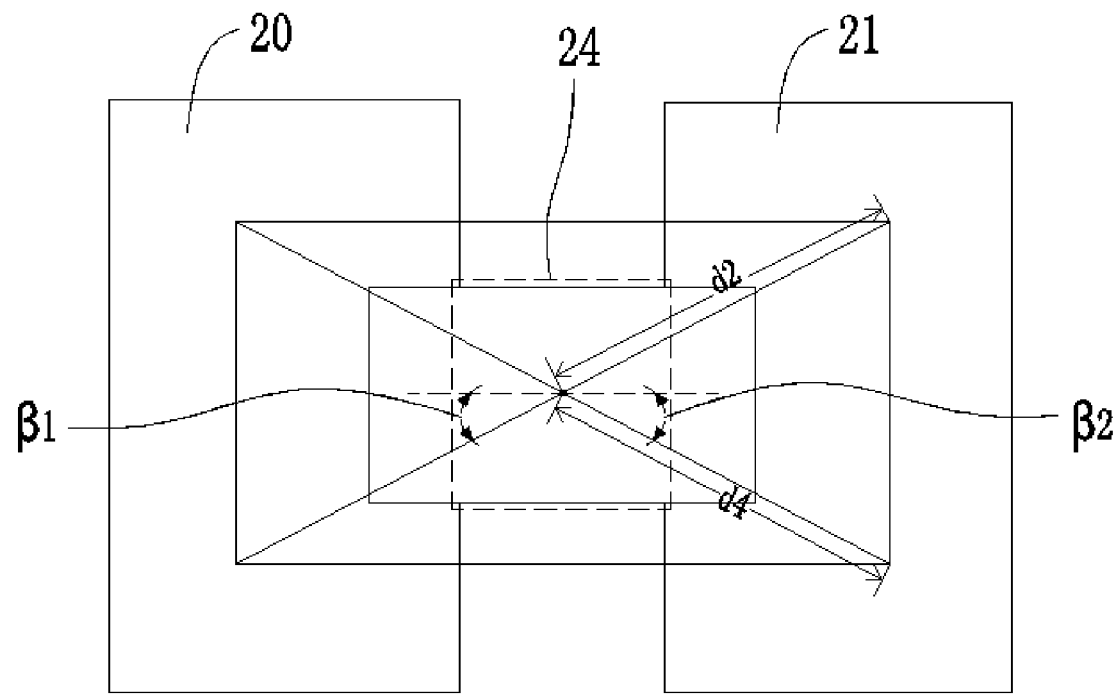
FIG. 2C is a schematic structural diagram of a window structure of a mineral oil layer of a flexible circuit substrate according to an embodiment of the present disclosure.

Refer to FIGS. 2A to 2C, schematic structural diagrams of a window structure of a mineral oil layer of a flexible circuit substrate according to an embodiment of the present disclosure are provided. Refer to FIG. 2A, a first pad 20 is disposed on the flexible substrate. A second pad 21 is disposed on the flexible substrate and spaced apart from the first pad 20 to form a gap therebetween. The mineral oil layer is disposed on the flexible substrate, the first pad 20, and the second pad 21. The mineral oil layer is etched to form a window opening region 22. The first pad 20 includes a positive electrode, the second pad 21 includes a negative electrode, and the window opening region 22 exposes at least the positive electrode of the first pad 20 and the negative electrode of the second pad 21. The LED chip 23 is disposed on the mineral oil layer, and pins of two ends of the LED chip 23 are electrically connected to the positive electrode of the first pad 20 and the negative electrode of the second pad 21 respectively through the window opening region 22.

The LED chip 23 forms a first overlapping region 201 with the first pad 20, a second overlapping region 211 with the second pad 21, and a non-overlapping region between the first overlapping region 201 and the second overlapping region 211. The window opening region 22 overlaps at least the first overlapping region 201 and the second overlapping region 211.

That is, the mineral oil layer corresponding to the non-overlapping region is retained, and the LED chip 23 is connected to the positive electrode of the first pad 20 through the first overlapping region 201 and connected to the negative electrode of the second pad 21 through the second overlapping region 211. A portion of the LED chip 23 corresponding to the non-overlapping region is insulated from the front copper trace through the mineral oil layer.

In addition, an area of the window opening region 22 of the mineral oil layer is the smallest, and since the reflectivity of the mineral oil is greater than that of metal copper, a reflectivity of the flexible circuit substrate is improved, this improves an overall illuminating performance of the surface light source.

In an embodiment, areas of the first overlapping region 201 and the second overlapping region 211 are same.

In an embodiment, a thickness of the mineral oil layer corresponding to the non-overlapping region is less than a thickness of the mineral oil layer corresponding to a remaining region. It is avoided that the pins of the LED chip 23 are not completely in contact with the pads, resulting in an occurrence of a dummy solder during soldering of the LED chips 23.

In addition, the window opening region 22 may also extend from a boundary of the non-overlapping region to two sides of the non-overlapping region to not exceed a boundary of the pads to form the window opening region 22 exposing the first overlapping region 201 and the second overlapping region 211. It can be understood that the positive electrode and the negative electrode overlap with the first overlapping region 201 and the second overlapping region 211, respectively. Alternatively, the positive electrode and the negative electrode are completely covered by the first overlapping region 201 and the second overlapping region 211, and is not limited herein. Of course, a boundary of the window opening region 22 can also extend beyond the boundary of the pad, but this means that the area of the window opening region 22 is increased, which is disadvantageous for improvement of illuminating performance of the surface light source.

In an embodiment, the window opening region 22 extends from a boundary of the non-overlapping region to a periphery of the non-overlapping region, and an edge of the window opening region 22 corresponds to the window opening area 22 disposed on the pads and exposing at least the first overlapping region 201 and the second overlap region 211, such that areas of the window opening region 22 corresponding to the first pad 20 and the second pad 21 at two sides of the non-overlapping region are same.

In an embodiment, an area of the pad exposed by the window opening region 22 is about 20% greater than an area of the LED chip 23.

As illustrated in FIGS. 2B to 2C, an intermediate region 24 (that is the non-overlapping region) between the positive electrode of the first pad 20 and the negative electrode of the second pad 21 is positioned on the flexible circuit substrate. A layer of the mineral oil layer is disposed on the flexible circuit substrate, and the intermediate region 24 is also covered by the mineral oil layer. In an embodiment, the mineral oil layer has a thickness of 25 μm±3 μm. Further, a thinning treatment to the mineral oil layer in the intermediate region 24 is performed, and the mineral oil layer positioned on the intermediate region 24 may be embossed using a corresponding imprinting mold, or etched using an etching process. A thickness of an original mineral oil layer of the intermediate region 24 is reduced to less than 10 μm, such that a height difference is formed between a thinning portion of the mineral oil layer and a portion surrounding the thinning portion of the mineral oil layer. On one hand, a dummy soldering of the LED chip 23 in a die bonding operation can be improved by the height difference, and on another hand, a charge-coupled device (CCD) (photosensitive element) can be accurately grasped and positioned to ensure an accuracy of subsequent windowing process of the mineral oil layer. Then, a center of a portion of the mineral oil layer corresponding to the intermediate region 24 is grasped by the CCD, and the mineral oil layer is etched from the boundary of the intermediate region 24 to the periphery of the intermediate region 24 with reference to the center of the portion of the mineral oil layer. In an embodiment, a range of the window opening region 22 satisfies d1=d2, d3=d4, α1=α2, and β1=β2. In order to ensure that size ratios of the pads exposed on two sides of the intermediate region 24 are same, solders paste on the pads are ensured to have a same height when the LED chip 23 is performed in die bonding and solder pasting processes, this ensures in the die bonding process, the LED chip 23 does not tilt, and the LED chip 23 in the reflow process does not cause tilting due to a difference in amount of solder pastes of the positive and negative electrodes, thereby ensuring a uniformity of brightness of the surface light source.

Figure 3:
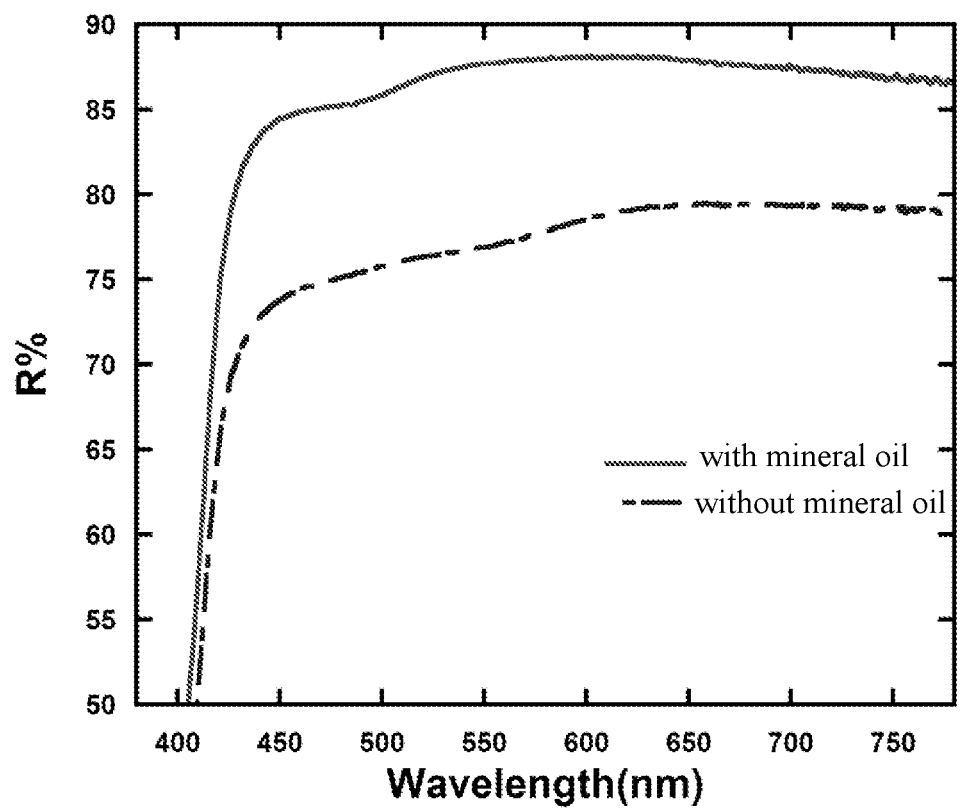
FIG. 3 is a comparison diagram of reflectivity in cases where intermediate region of two electrodes of pads with mineral oil and without mineral oil according to an embodiment of the present disclosure.

As illustrated in FIG. 3, a comparison diagram of reflectivity in cases where intermediate region of two electrodes of pads with mineral oil and without mineral oil according to an embodiment of the present disclosure is provided. It can be seen that a reflectivity of the mineral oil in the intermediate region of the two electrodes of the pads is 10% greater than that without mineral oil. Addition of mineral oil in the intermediate region of the two electrodes of the pads can reduce an area of the window opening region of the mineral oil. Therefore, the embodiment is advantageous for improving the reflectivity of the flexible circuit substrate, thereby improving an overall illuminating performance of the surface light source.

An embodiment of the present disclosure also provides a method of manufacturing a backlight module. The backlight module includes a surface light source and a flexible circuit substrate. As illustrated in FIG. 4, the method of manufacturing the flexible circuit substrate includes following steps.

Step S10 of providing a flexible substrate having a front copper trace and a back copper trace formed on surfaces of the flexible substrate is provided. The flexible substrate includes a first pad and a second pad spaced from each other, the first pad includes a positive electrode, the second pad includes a negative electrode, and an intermediate region between the positive electrode and the negative electrode is positioned.

For specific location of the intermediate region, refer to the description in the foregoing embodiment and FIG. 2B, and details are not described herein again.

Step S20 of forming a mineral oil layer on the flexible substrate and performing a thinning treatment to the mineral oil layer in the intermediate region, such that the mineral oil layer in the intermediate region forms a height difference with the mineral oil layer in a remaining region is provided.

In details, performing the thinning treatment to the mineral oil layer in the intermediate region includes embossing the mineral oil layer in the intermediate region using a corresponding imprinting die or etching the mineral oil layer using an etching process.

Step S30 of etching the mineral oil layer, forming a window opening region exposing at least the positive electrode and the negative electrode outside the intermediate region, and then curing the mineral oil layer is provided.

In details, grasping a center of a corresponding portion of the mineral oil layer corresponding to the intermediate region with a CCD, and etching from a boundary of the intermediate portion to a periphery with respect to the center to form a window opening region having a ring shape exposing at least the positive electrode and the negative electrode.

In details, the boundary of the window opening region is located at a position corresponding to the pads, and the window opening region is minimized as much as possible without affecting soldering of the LED chip.

Areas of the window opening region corresponding to the first pad and the second pad at the two sides of the intermediate region are same. For details, refer to the description of the foregoing embodiment.

Step S40 of electrically connecting the LED chip to the positive electrode and the negative electrode through the window opening region is provided.

Soldering of the LED chip can be performed using a conventional method, and is not limited herein.

The present disclosure has beneficial effects that compared with a current backlight module, in the backlight module and the manufacturing method of same of the embodiment of the present disclosure, the intermediate region between the positive electrode of the first pad and the negative electrode of the second pad of the flexible circuit substrate including the mineral oil layer is positioned, and a structure of the window opening region has a positioning function. Compared with a current structure of a window opening region, the embodiment can reduce an area of the window opening region of the mineral oil layer and increase an area ration of the mineral oil layer on the substrate, such that a pad size on two sides of the opening window region of the mineral oil layer is ensured to be same. On one hand, a reflectivity of an entire surface of the substrate is increased to improve an overall illuminating performance of a surface light source, and on another hand, an area of the opening window region and tolerance on two sides of the mineral oil layer in the intermediate region is controlled, such that an arrangement of the LED chip is not tilted in subsequent die bonding and reflow soldering processes, and an overall uniformity of the surface light source is improved.

The above descriptions are merely preferred implementations of the present disclosure, it should be noted that those of ordinary skill in the art can make a variety of improvements and substitutions on the premise of not deviating from the technical principle of the present disclosure, and these improvements and substitutions should be encompassed within the protection scope of the present disclosure.

The invention claimed is:

1. A backlight module comprising a surface light source and a flexible circuit substrate, wherein the flexible circuit substrate comprises:
a flexible substrate;
a first pad disposed on the flexible substrate;
a second pad disposed on the flexible substrate and spaced apart from the first pad;
a mineral oil layer disposed on the flexible substrate, the first pad, and the second pad, wherein the mineral oil layer is patterned to form a window opening region;
a light emitting diode (LED) chip disposed on the mineral oil layer, wherein two ends of the LED chip are electrically connected to the first pad and the second pad respectively through the window opening region;
wherein the LED chip forms a first overlapping region with the first pad, a second overlapping region with the second pad, and a non-overlapping region between the first overlapping region and the second overlapping region; and
wherein the window opening region overlaps at least the first overlapping region and the second overlapping region;
wherein a thickness of the mineral oil layer corresponding to the non-overlapping region is less than a thickness of the mineral oil layer corresponding to a remaining region.

2. The backlight module according to claim 1, wherein the flexible circuit substrate further comprises a back copper trace disposed on one side surface of the flexible substrate and a front copper trace disposed on another side surface of the flexible substrate, wherein the front copper trace is connected to the LED chip.

3. The backlight module according to claim 2, wherein the mineral oil layer is disposed on the front copper trace, and a portion of the LED chip corresponding to the non-overlapping region is insulated from the front copper trace using the mineral oil layer.

4. The backlight module according to claim 1, wherein the first pad comprises a positive electrode, the second pad comprises a negative electrode, the LED chip is connected to the positive electrode through the first overlapping region, and the LED chip is connected to the second overlapping region through the negative electrode.

5. The backlight module according to claim 1, wherein the window opening region extends from a boundary of the non-overlapping region to two sides or a periphery of the window opening region to form the window opening region exposing at least the first overlapping region and the second overlapping region, and areas of the window opening region corresponding to the first pad and the second pad at two sides of the non-overlapping region are same.

6. A method of manufacturing a backlight module, the backlight module comprising a surface light source and a flexible circuit substrate, wherein the method comprises:

a step S10 of providing a flexible substrate having a front copper trace and a back copper trace formed on surfaces of the flexible substrate, wherein the flexible substrate comprises a first pad and a second pad spaced from each other, the first pad comprises a positive electrode, the second pad comprises a negative electrode, and an intermediate region between the positive electrode and the negative electrode is positioned;

a step S20 of forming a mineral oil layer on the flexible substrate and performing a thinning treatment to the mineral oil layer in the intermediate region, such that the mineral oil layer in the intermediate region forms a height difference with the mineral oil layer in a remaining region;

a step S30 of etching the mineral oil layer, forming a window opening region exposing at least the positive electrode and the negative electrode outside the intermediate region, and then curing the mineral oil layer; and a step S40 of electrically connecting the LED chip to the positive electrode and the negative electrode through the window opening region.

7. The method according to claim 6, wherein in the step S20, performing the thinning treatment to the mineral oil layer in the intermediate region comprises:

embossing the mineral oil layer in the intermediate region using a corresponding imprinting die or etching the mineral oil layer using an etching process.

8. The method according to claim 6, wherein, in the step S30, etching the mineral oil layer comprises:

grasping a center of the intermediate region, and etching from a boundary of the intermediate region to two sides or a periphery of the intermediate region with reference to the center of the intermediate region to form the window opening region exposing at least the positive electrode and the negative electrode;

wherein areas of the window opening region corresponding to the first pad and the second pad at the two sides of the intermediate region are same.

9. A backlight module comprising a surface light source and a flexible circuit substrate, wherein the flexible circuit substrate comprises:

a flexible substrate;

a first pad disposed on the flexible substrate;

a second pad disposed on the flexible substrate and spaced apart from the first pad;

a mineral oil layer disposed on the flexible substrate, the first pad, and the second pad, wherein the mineral oil layer is patterned to form a window opening region;

a light emitting diode (LED) chip disposed on the mineral oil layer, wherein two ends of the LED chip are electrically connected to the first pad and the second pad respectively through the window opening region;

wherein the LED chip forms a first overlapping region with the first pad, a second overlapping region with the second pad, and a non-overlapping region between the first overlapping region and the second overlapping region;

wherein areas of the first overlapping region and the second overlapping region are same; and wherein the window opening region overlaps at least the first overlapping region and the second overlapping region;

wherein a thickness of the mineral oil layer corresponding to the non-overlapping region is less than a thickness of the mineral oil layer corresponding to a remaining region.

10. The backlight module according to claim 9, wherein the flexible circuit substrate further comprises a back copper trace disposed on one side surface of the flexible substrate and a front copper trace disposed on another side surface of the flexible substrate, wherein the front copper trace is connected to the LED chip.

11. The backlight module according to claim 10, wherein the mineral oil layer is disposed on the front copper trace, and a portion of the LED chip corresponding to the non-overlapping region is insulated from the front copper trace using the mineral oil layer.

12. The backlight module according to claim 9, wherein the first pad comprises a positive electrode, the second pad comprises a negative electrode, the LED chip is connected to the positive electrode through the first overlapping region, and the LED chip is connected to the second overlapping region through the negative electrode.

13. The backlight module according to claim 9, wherein the window opening region extends from a boundary of the non-overlapping region to two sides or a periphery of the window opening region to form the window opening region exposing at least the first overlapping region and the second overlapping region, and areas of the window opening region corresponding to the first pad and the second pad at two sides of the non-overlapping region are same.

* * * * *